United States Patent [19]

Seki

[11] Patent Number: 4,538,708

[45] Date of Patent: Sep. 3, 1985

[54] DISC BRAKE WITH A PAD RETAINING SPRING

[75] Inventor: Masayuki Seki, Nagano, Japan

[73] Assignee: Nisshin Kogyo Kabushiki Kaisha, Japan

[21] Appl. No.: 431,689

[22] Filed: Sep. 30, 1982

[30] Foreign Application Priority Data

| Sep. 30, 1981 | [JP] | Japan | 56-145552[U] |
| Sep. 30, 1981 | [JP] | Japan | 56-145553[U] |
| Sep. 30, 1981 | [JP] | Japan | 56-145555[U] |
| Sep. 30, 1981 | [JP] | Japan | 56-145556[U] |

[51] Int. Cl.³ .............................................. F16D 65/02
[52] U.S. Cl. ................................ 188/73.38; 188/73.45
[58] Field of Search ............... 188/73.38, 73.37, 73.36, 188/73.35, 73.45, 73.44, 73.43, 73.32, 73.33, 73.34, 205 A, 72.4

[56] References Cited

U.S. PATENT DOCUMENTS

| 3,937,304 | 2/1976 | Brix | 188/73.38 |
| 4,055,237 | 10/1977 | Numazawa et al. | 188/73.35 |
| 4,061,209 | 12/1977 | Gee et al. | 188/73.45 X |
| 4,342,381 | 8/1982 | Tamura | 188/73.38 |
| 4,369,862 | 1/1983 | Seki | 188/73.45 |
| 4,392,561 | 7/1983 | Watanabe | 188/73.36 |

FOREIGN PATENT DOCUMENTS

| 2514385 | 10/1975 | Fed. Rep. of Germany | 188/73.45 |
| 2548927 | 5/1976 | Fed. Rep. of Germany | 188/73.44 |
| 1625676 | 8/1980 | Fed. Rep. of Germany | 188/73.45 |
| 1362688 | 4/1964 | France | 188/73.45 |
| 1549524 | 12/1968 | France | 188/73.32 |
| 0109837 | 8/1980 | Japan | 188/73.38 |
| 1017210 | 1/1966 | United Kingdom . |
| 1037238 | 7/1966 | United Kingdom . |
| 1267199 | 3/1972 | United Kingdom . |
| 1477662 | 6/1977 | United Kingdom . |
| 1545644 | 5/1979 | United Kingdom . |
| 2056601 | 3/1981 | United Kingdom . |
| 2066911 | 7/1981 | United Kingdom . |
| 2109491 | 6/1983 | United Kingdom | 188/73.38 |

Primary Examiner—Douglas C. Butler
Attorney, Agent, or Firm—Cantor and Lessler

[57] ABSTRACT

A disc brake arrangement for vehicles comprises a disc rotatable with a wheel, a pair of friction pads disposed on both sides of the disc and movable along the axis of the disc, a caliper including a bridge portion disposed across the disc and an actuating device for engaging the friction pads with the disc, and a pad spring including two sets of pad-engaging portions for retaining the friction pads independently of each other in the radial direction of the disc under a given load and a joining portion for the connection of one set of pad-engaging portions with the other set of pad-engaging portions. The caliper is supported by a bracket in such a manner that it is slidable toward the axis of the disc. The caliper further includes an operable portion with a built-in cylinder in which is slidably housed a piston for engaging one friction pad with one side of the disc and a reaction force portion for engaging the other friction pad with the other side of the disc by the movement of the caliper.

7 Claims, 15 Drawing Figures

DISC BRAKE WITH A PAD RETAINING SPRING

BACKGROUND OF THE INVENTION

The present invention relates to a disc brake arrangement for vehicles and, more specifically, to a disc brake arrangement including a disc rotatable with a wheel, a caliper having a bridge portion disposed across the disc, a pair of friction pads disposed on both sides of the disc in such a manner that they are movable along the axis of the disc, means provided on the caliper for engaging the pads with the disc and a pad spring for retaining the pads in place under load.

As is well-known in the art, the disc brake arrangements of the floating caliper type or the opposed piston type are provided with a pad spring adapted to prevent vibration and rattling of friction pads which engage with a disc for braking. The pad spring is formed of a single elastic plate, and interposed between the upper portions of the pads and the inner wall of the bridge portion of the caliper.

With the floating caliper type brake, however, the point of pad-engagement of the pad spring on the reaction force side remains intact, but the point of pad-engagement of the pad spring on the operable side shifts with the resulting increase in load, as the friction pads wear away.

Consequently, difficulties are encountered in maintaining a load preset by the pad spring, so that the friction pads are out of balance, leading to a tilt, local wearing or dragging thereof.

With the opposed piston type brake, on the other hand, there may be a non-uniform change in the amount of movement of both friction pads. That change also causes the pads to be out of balance, thus offering such problems as mentioned above.

Furthermore, the pad spring should be located and temporarily held in place to permit simple and easy assembling thereof.

A misalignment problem arises particularly with a pad spring whose pad engaging portions are different in shape on the operable and reaction force sides.

With a disc brake including a caliper formed by casting, the inside face of the reaction force portion to be in abutting contact with the rear plates of friction pads is mechanically finished, while the central inner wall of the bridge portion for supporting a pad spring is as-cast. For this reason, a difficulty is encountered in arranging the said inside face at a right angle with the said central inner wall, so that a load preset by the pad spring becomes unstable. This causes a tilt, local wearing and dragging of the friction pads.

With another pad spring including pad-engaging portions which are separately formed on the operable and reaction force sides, extra work is required since friction pads have to be associated and located appropriately with the respective pad-engaging portions.

SUMMARY OF THE INVENTION

A main object of the present invention is therefore to provide a disc brake arrangement for vehicles, comprising a disc rotatable with a wheel, a pair of friction pads disposed on both sides of said disc and movable along the axis of said disc, a caliper including a bridge portion disposed across said disc and means for engaging said friction pads with said disc, and a pad spring including two sets of pad-engaging portions for retaining said friction pads independently of each other in the radial direction of said disc under a given load and a joining portion for the connection of one set of pad-engaging portion with the other set of pad-engaging portions.

Another object is to provide an arrangement of the above-mentioned type in which said caliper is supported by a bracket in such a manner that it is slidable toward the axis of said disc, and includes an operable portion with a built-in cylinder in which is slidably housed a piston for engaging one friction pad with one side of said disc and a reaction force portion for engaging the other friction pad with the other side of said disc by the movement of said caliper.

BRIEF DESCRIPTION OF THE DRAWINGS

The above-mentioned and other objects and features of the present invention will become apparent from the following detailed description of the preferred embodiments of the present invention with reference to the accompanying drawings, in which:

FIGS. 1, 2, 3, 4 and 5 show together one embodiment of the present invention wherein FIGS. 6, 7, 8, 9 and 10 show together another embodiment of the present invention wherein FIGS. 11, 12, 13, 14 and 15 show together a further embodiment of the present invention wherein

DESCRIPTION OF THE PREFERRED EMBODIMENTS

One preferred embodiment of the present invention will now explained with reference to FIGS. 1 through 5 inclusive.

Figure 1:
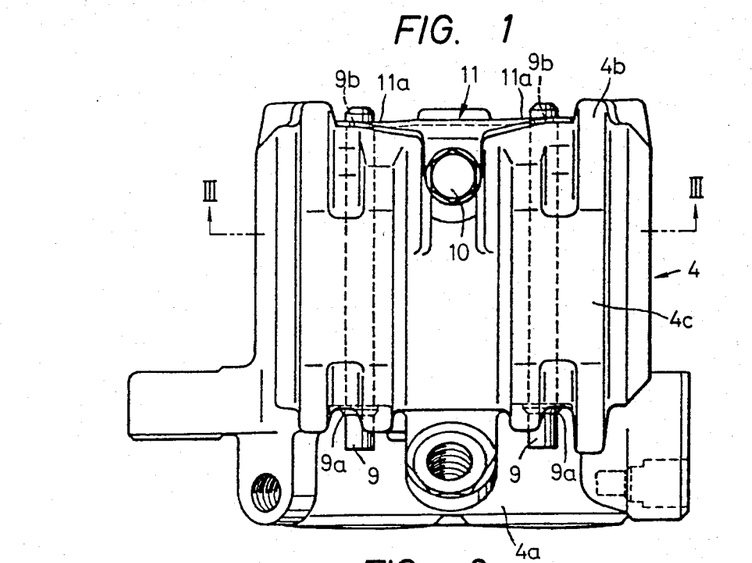
FIG. 1 is a plan view.
Figure 2:
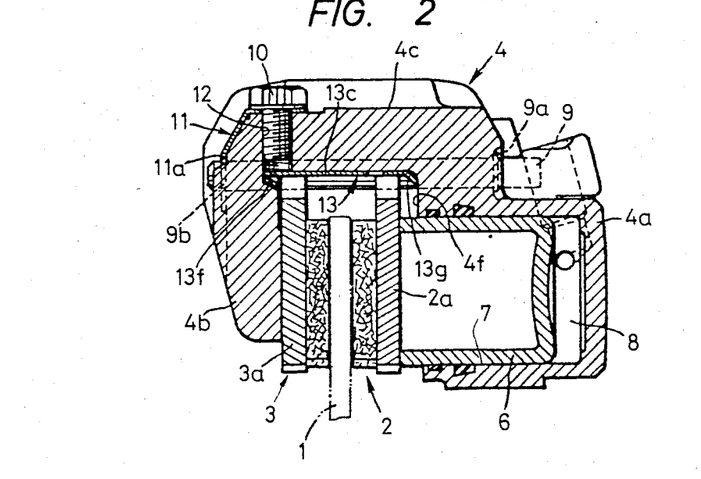
FIG. 2 is a sectional front view, FIG. 3 a sectional view taken along the line III—III of FIG. 1, FIG. 4 a plan view of the pad spring, and FIG. 5 a front view of the pad spring.
Figure 3:
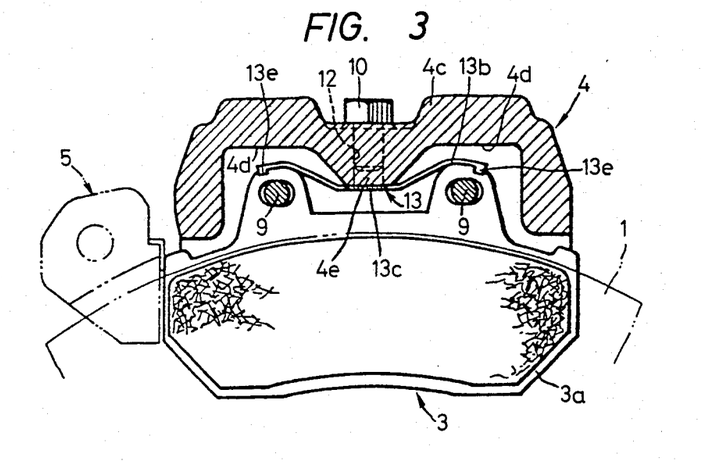

A disc 1 rotatable with a wheel (not shown) is provided on both its sides with a pair of friction pads 2 and 3. A caliper generally shown at 4 is supported on a bracket 5 fixed to a vehicle body (not shown) in such a manner that it is movable toward the axis of the disc 1, and includes an operable portion 4a and a reaction force portion 4b which are joined to each other through a bridge portion 4c. The bridge portion 4c is disposed across the disc 1 and the friction pads 2 and 3 provided on both sides thereof, and the operable portion 4a defines a cylinder 7 within which a piston 6 is housed. Operation of a master cylinder (not shown) causes a supply of a pressurized liquid into a space 8, i.e., a liquid chamber 8, defined by the piston 6 and the operable portion 4a. The piston 6 then moves forward under the action of the pressurized liquid, and applies a pressure to the back side of a rear plate 2a of the friction pad 2 on the operable side, so that the rear plate 2a engages with one side of the disc 1, while the reaction force portion 4b abuts upon the back side of a rear plate 3a of the friction pad 3.

A pair of hanger pins 9 and 9, parallel with the axis of the disc 1, are detachably provided between the operable portion 4a and the reaction force portion 4b, and both friction pads 2 and 3 have their rear plates 2a and 3a passed through the hanger pins 9 and 9, so that they are slidable along the disc 1. The hanger pins 9 and 9 are provided at one end with locating projections 9a and 9a and at the other end with annular grooves 9b and 9b. The projections 9a and 9a abut upon the outer surface of the operable portion 4a to locate the positions at which the hanger pins 9 and 9 are mounted in place. The hanger pins 9 and 9 project from the reaction force portion 4b at the annular grooves 9b and 9b into which are fitted pieces 11a and 11a of a keeping member 11 fixed to the bridge portion 4c by means of a bolt 10.

The bolt 10 is screwed into a through-hole 12 formed in the bridge portion 4c located on the operable side. The hole 12 passes vertically through the bridge portion 4c and terminates in the inner wall of the reaction force portion 4b.

Between the inner wall of the bridge portion 4c of the caliper 4 and the friction pads 2, 3 there is a pad spring 13 for retaining the pads 2, 3 inwardly in the radial direction of the disc 1 under a given load.

Figure 4:
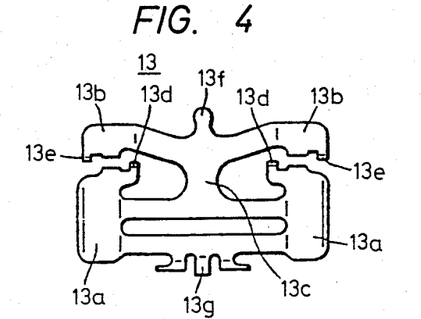
Figure 5:
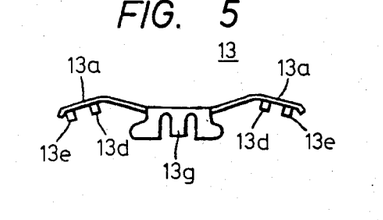

As depicted in FIGS. 4 and 5, the pad spring 13 includes a pair of pad-engaging portions 13a and 13a of large width, which extend at slight angles with respect to a central inner wall 4d of the bridge portion 4c and engage slidably with the upper portion of the rear plate 2a of the friction pad 2 located on the operable side, a pair of pad-engaging portions 13b and 13b of a width substantially equal to that of the rear plate 3a of the friction pad 3 located on the reaction force side, which extend at slight angles with respect to the said central inner wall 4d and engage with the upper portion of the said rear plate 3a, a joining portion 13c for the connection of the pad-engaging portion 13a and 13a located on the operable side with the pad-engaging portions 13b and 13b located on the reaction force side, said joining portion engaging with a rib portion 4e which extends from the said central inner wall 4d toward the axis of the disc, and stopper pieces 13d, 13d and 13e, 13e provided on the parts of the said pad-engaging portions 13a, 13a and 13b, 13b located on the disc side for restraining the friction pads 2 and 3 from moving along the axis of the disc. Furthermore, the joining portion 13c is provided on the reaction force side with a projection 13f which is fitted into the said hole 12, and on the operable side with a piece 13g which engages with the side wall 4f of the bridge portion 4c located on the operable portion side.

The pad spring 13 is located with respect to the operable and reaction force sides by fitting the projection 13f into the said hole 12, and then temporarily held in place by engaging the piece 13g with the said side wall 4f and the joining portion 13c with the said rib portion 4e. Subsequently, the friction pads 2 and 3 are supported by the hanger pins 9 and 9, so that the pad-engaging portions 13a, 13a and 13b, 13b of the spring 13 force the upper portions of the said rear plates 2a and 3a inwardly in the radial direction of the disc 1, whereby the said rear plates 2a and 3a are retained under a load preset by the pad spring 13 to prevent vibration and rattling of the pads 2 and 3.

The first embodiment according to the present invention operates as follows:

A pressurized liquid is supplied from a master cylinder (not shown) to the liquid chamber 8 by a brake pedal. The piston 6 moves forward under the action of the pressurized liquid, and causes the friction pad 2 (located on the operable side) to engage with one side of the disc 1. The resulting reaction allows the caliper 4 to move in the direction opposite to the movement of the piston 6, so that the reaction force portion 4b moves the opposite friction pad 3 into engagement with the other side of the disc 1. Thus, the disc 1 is braked.

When the friction pads 2 and 3 wear away due to repeated braking, the pad 2 (located on the operable side) slides over the pad-engaging portions 13a and 13a of the pad spring 13, while the pad-engaging portions 13b and 13b (on the reaction force side) remain intact. Consequently, the points of engagement of the pad-engaging portions 13a and 13a shift toward the reaction force side. Such a shift of the points of engagement causes that the load set by the pad spring 13 to vary from the initial value. However, a variation of the load taking place on the operable side has no substantial influence on the reaction force side, since the pad-engaging portions 13a, 13a and 13b, 13b are formed independently of, and are connected through the joining portion 13c to, those on the reaction force side. Accordingly, the friction pads 2 and 3 (on the operable and reaction force side) are retained by the pad spring 13 with a given range of force without causing any tilt, local abrasion and dragging of those pads. The said stopper pieces 13d, 13d and 13e, 13e also ensure prevention of disengagement of the friction pads 2 and 3 out of the associated pad-engaging portions 13a, 13a and 13b, 13b.

During braking, the friction pads 2 and 3 engage smoothly and parallel with the disc 1, so that vibration and rattling of those pads are effectively avoided. This is because the friction pads 2 and 3 are retained inwardly in the radial direction of the disc 1 under a given load preset by the pad spring 13 appropriately fixed to the bridge portion 4c of the caliper 4.

To replace the worn-out friction pads 2 and 3 with new ones, the caliper 4 is turned outwardly in the radial direction of the disc 1 with respect to the bracket 5 to prepare a working space on the opening side of the caliper 4, through which the hanger pins 9 and 9 are pulled out, so that the new friction pads may be located. Then, the projection 13f of the pad spring 13 is fitted into the hole 12 at a right angle with the axial direction, and the piece 13g thereof is engaged with the side wall 4f of the bridge portion 4c (on the operable side), so that the pad spring 13 is temporarily fixed to the caliper 4. Therefore, there is no possibility that the pad spring 13 may be subjected to displacement, thus making assembling of the friction pads 2 and 3 difficult and leading to disengagement of the pad spring 13.

Removal of the pad spring 13 from the caliper 4 is very easily achieved by pulling it down by a tool or other means to disengage the engaging piece 13g out of the side wall 4f of the bridge portion 4c (on the operable side). Re-attachment of the pad spring 13 to the caliper 4 is achieved by fitting the projection 13f into the hole 12 to locate that spring with respect to the operable and reaction force sides and forcing it against the central inner wall 4d of the bridge portion 4c, thereby to cause the joining portion 13c to abut upon the rib portion 4e and the engaging pece 13g to engage with side wall 4f of the bridge portion 4c (on the operable side).

Even with a pad spring whose pad-engaging portions are different in shape on the operable and reaction forces sides, therefore, it is possible to effectively prevent misalignment which is liable to take place during assembling.

While the first embodiment of the present invention has been described with reference to the floating caliper type disc brake, it is applicable to the opposed piston type disc brake alike.

As already mentioned, if the friction pad on the operable side moves toward the disc owing to abrasion of the pads, the point of engagement of the pad-engaging portion of the pad spring (on the same side) then shifts, thus leading to a variation of load. According to the foregoing embodiment, however, such a variation of load is not substantially transmitted to the reaction force side, so that both friction pads are retained in place with a given range of force preset by the pad spring. This assures that the friction pads are effectively prevented from vibration and rattling with no substantial tilt, local wearing and dragging thereof.

Furthermore, the friction pads may move toward the disc during braking, but excessive movement thereof is restricted by the stopper pieces with no risk of disengagement of the pads out of the associated pad-engaging portions of the pad spring. Thus, effective braking is constantly achieved.

In addition, the pad spring is disposed in such a manner that the friction pads are held against the inner wall of the bridge portion under a given preset load, thereby effectively preventing vibration and rattling of the friction pads. Even when the worn-out pads are replaced with new ones, there is no fear that the pad spring may shift in position, thus making assembling of the new pads difficult and leading to disengagement thereof.

Removal of the pad spring is easily achieved by pulling it toward the opening side of the bridge by a tool or other means. Re-attachment of the pad spring is also easily achieved by fitting the projection into the through-hole and, then, forcing it against the central inner wall of the bridge portion.

Even with a pad spring whose pad-engaging portions are different in shape on the operable and reaction force sides, no misalignment takes place since the pad spring is located by fitting the projection into the through-hole.

That through-hole may be formed by extending a hole into which a bolt is inserted or fixing the keeping member in place for preventing disengagement of the hanger pins. Thus, a reduction in the production cost is expected since it is unnecessary to provide an extra hole in the inner wall of the bridge portion.

Another embodiment of the present invention will now be explained with reference to FIGS. 6 through 10 inclusive.

Figure 9:
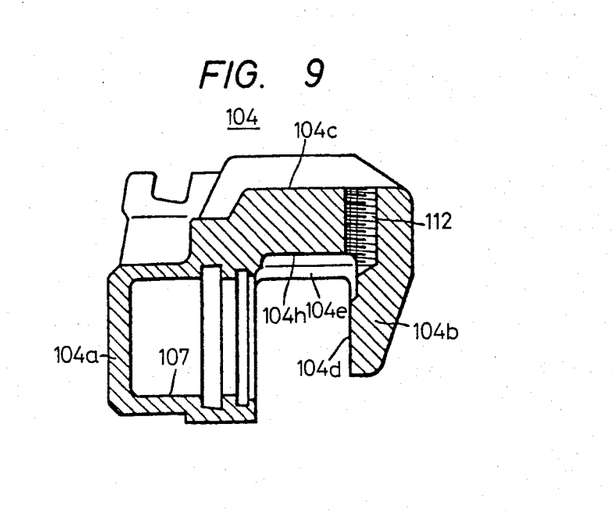
FIG. 9 is a sectional view of the caliper as viewed in the direction parallel with the axis of the cylinder and FIG. 10 is a sectional view of the caliper as viewed in the direction perpendicular to the axis of the cylinder.
Figure 10:
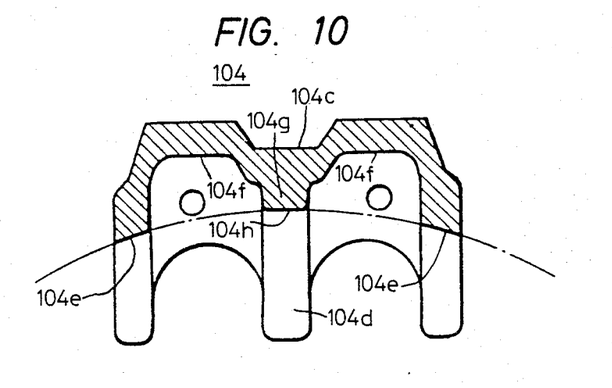
Figure 11:
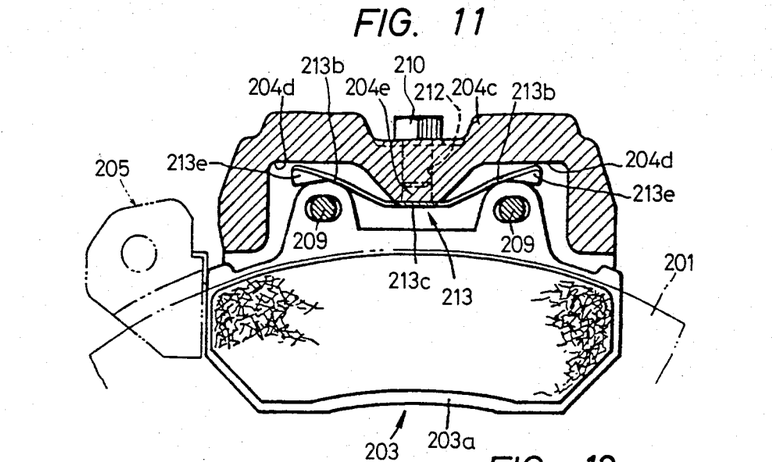
FIG. 11 is a sectional view as viewed in the direction perpendicular to the axis of the disc.
Figure 12:
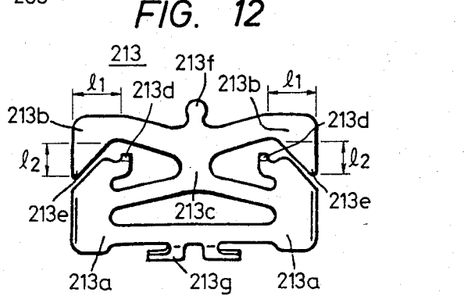
FIG. 12 is a plan view of the pad spring.
Figure 13:
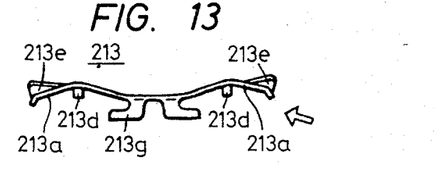
FIG. 13 is a front view of the pad spring.
Figure 14:
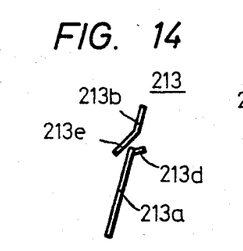
FIG. 14 is a perspective end view of FIG. 13

As depicted in FIGS. 9 and 10, a caliper 104 is formed by casting, including a reaction force portion 104b and a bridge portion 104c. The inside face 104d of the reaction force portion, the lower faces, 104e, 104e of the side walls of the bridge portion and the face 104h of a rib portion 104g of a central inner wall 104f of the bridge portion, said rib portion extending toward the axis of a disc 101, are flattened by a rotary cutter having a square edge, with its shaft being disposed in coincidence with the axis of the disc. The thus flattened face 104d is at a right angle with the axis of a cylinder, while the thus flattened rib face 104h is parallel with the axis of the cylinder. Thus, the face 104d is arranged perpendicularly to the face 104h.

The reaction force portion 104b is adapted to abut at its inside face 104d upon the back side of a rear plate 103a of a friction pad 103, whereby the friction pad 103 is located parallel with the braking plane of the disc 101.

Figure 6:
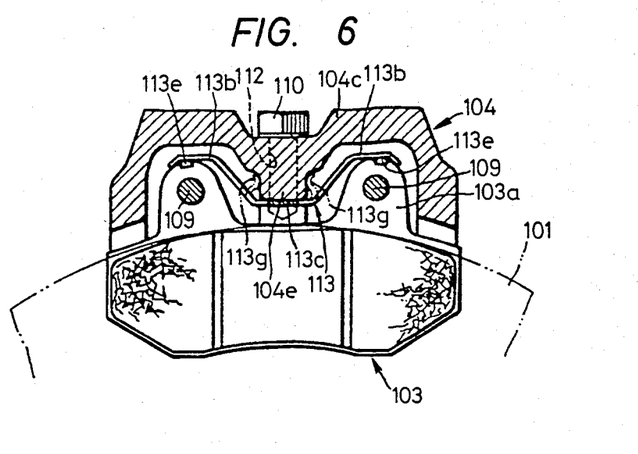
FIG. 6 is a sectional view as viewed in the direction perpendicular to the axis of the disc.
Figure 7:
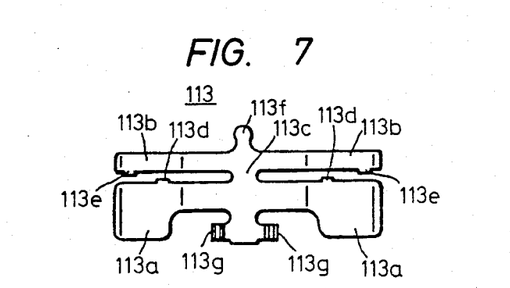
FIG. 7 is a plan view of the pad spring.
Figure 8:
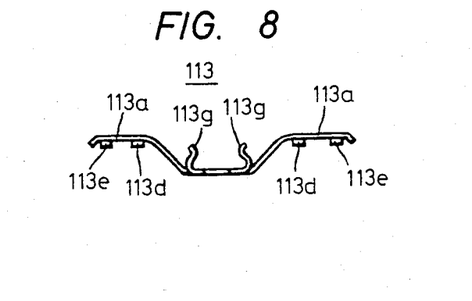
FIG. 8 is a front view of the pad spring.

A pad spring 113 includes a pair of pad-engaging portions 113a and 113a of large width, which engage slidably with the upper portion of the rear plate of a friction pad located on the operable side, a pair of pad-engaging portions 113b and 113b of a width virtually equal to that of the rear plate 103a of the friction pad 103 located on the operable side, which engage with the upper portion of the said rear plate 103a of a friction pad 103 located on the reaction force side, a joining portion 113c for the connection of the pad-engaging portions 113a and 113a located on the operable side with the pad-engaging portions 113b and 113b located on the reaction force side, said joining portion engaging with the face 104h of a rib portion which extends from the said central inner wall 104d toward the axis of the disc, and anchoring pieces 113d, 113d and 113e, 113e provided on the parts of the said pad-engaging portions 113a, 113a and 113b, 113b located on the disc side for restraining the friction pads 102 and 103 from moving along the axis of the disc 101. Furthermore, the joining portion 113c is provided on the reaction force side with a projection 113f which is fitted into a through-hole 112 formed in the bridge portion 104c and on the operable side with a claw 113g which engages with the rib portion 104g of the bridge portion 104c.

The pad spring 113 is located with respect to the operable and reaction force sides by fitting the projection 113f into the through-hole 112, and then temporarily held in place by engaging the claw piece 113g with both sides of the rib portion 104g of the bridge portion 104c to engage the joining portion 113c with the face 104h of the rib portion. Subsequently, a pair of friction pads are supported by hanger pins 109 and 109, so that the pad-engaging portions 113a, 113a and 113b, 113b of the spring 113 force the upper portions of the rear plates of the friction pads inwardly in the radial direction of the disc 101, whereby the spring 113 is held parallel with the axis of the disc to retain the pads under a preset load. Thus, the friction pads are prevented from vibrating and rattling. Local wearing and dragging of the pads 113 are also avoided since there is no tilt thereof.

When the worn-out pad springs are replaced with new ones, the projection 113f of the pad spring 113 is fitted into the through-hole 112 at a right angle with the axial direction, and the claw 113g is engaged with both sides of the rib portion 104e of the bridge portion 104c, so that the spring 113 is temporarily fixed to the caliper 104. Therefore, there is no possibility that the pad spring 113 may be subjected to displacement, thus making assembling of the friction pads difficult and leading to disengagement of the pad spring 113.

Removal of the pad spring 113 from the caliper 104 is very easily achieved by pulling it down by a tool or other means to disengage the claw piece 113g out of the rib portion 104e of the bridge portion 104c. Reattachment of the pad spring 113 to the caliper 104 is achieved by fitting the projection 113f into the through-hole 112 to locate that spring with respect to the operable and reaction force sides and forcing it against the central inner wall 104d of the bridge portion 104c, thereby to cause the joining portion 113c to abut upon the rib portion 104e and the claw piece 113g to engage with both sides of the rib portion 104e.

Even with a pad spring whose pad-engaging portions are different in shape on the operable and reaction force sides, therefore, it is possible to effectively prevent misalignment which is liable to take place during assembling.

According to the second embodiment of the present invention, the inside face of the reaction force portion of the caliper is perpendicular to the axis of the cylinder, while the face of the rib portion extending from the central inner wall of the bridge portion is parallel with the axis of the cylinder. Both the said faces are thus arranged perpendicularly to each other by simultaneous cutting thereof. Hence, the friction pad on the reaction force side is surely held in place at a right angle with the axis of the disc.

Unlike the as-cast caliper, the pad spring having its claw engaged with both sides of the rib portion and its joining portion fitted over the flat face of the rib portion exhibits a reduced dimensional variation, is parallel with the axis of the disc, and serves to retain the friction pads inwardly in the radial direction of the disc under a given load. The load preset by the pad spring is thus so stable that the friction pads engage smoothly and parallel with the disc. Hence, good braking is achieved, and local wearing and dragging of the friction pads are substantially eliminated since they are parallel with the axis of the disc.

A further embodiment of the present invention will now be explained with reference to FIGS. 11 through 15 inclusive.

An illustrated pad spring 213 is provided on the reaction force sides of pad-engaging portions 213a and 213a (located on the operable side) with stopper pieces 213d and 213d for restraining the amount of movement of friction pads, said pieces being bent in the radial direction of a disc, and on the operable sides of pad-engaging portions 213b and 213b (located on the reaction force side) with guide pieces 213e and 213e, said guide pieces extending from said pieces 213d and 213d and being bent toward a central inner wall 204d of a bridge portion. The guide pieces 213e and 213e are extended toward the operable side into triangular shapes, and are outside of the reaction force sides of the pad-engaging portions 213a and 213a. This determines a lap $l_1$ for the friction pad in its peripheral direction and a lap $l_2$ for the friction pad in its moving direction. Thus, the movement of the friction pad 203 of reaction force side can be guided. Furthermore, the pad spring 213 is provided on the reaction force side with a projection 213f which is to be fitted in a through-hole 212 formed in the bridge portion 204c, and on the operable side with a bent piece 213g which is to engage with the side wall 204f (on the operable side) of the bridge portion 204c.

When the friction pads wear away due to repeated braking, and move toward the disc, the pad spring 213 restricts at its stopper pieces 213d and 213d the movement of the pads to prevent them from exceeding the abrasion limits.

In replacement of the worn-out pads with new ones, one may accidentally located both friction pads at the pad-engaging portions 213a and 213a (on the operable side) of the pad spring 213. However, the friction pad can easily be set in place on the reaction force side by extending the disc 201 between both friction pads to force a caliper 204 against a bracket 205. Since the friction pad 203 on the reaction force side is positioned at the pad-engaging portions 213a and 213a on the operable side, that pad is then forced upon by the disc 201 whereby the pad-engaging portions 213a and 213a are separated from the pad-engaging portions 213b and 213b. As a result, a step is formed between both portions 213a, 213a and 213b, 213b. Subsequently, the upper portion of the rear plate 203a of the pad 203 abuts upon the guide pieces 213e and 213e of the pad-engaging portions 213b and 213b, so that the friction pad is forced inwardly in the radial direction of the disc 201 by the caliper 204, while the friction pad 203 an enlarging force on the reaction force side 204b, whereby the rear plate 203a is guided by the guide pieces 213e and 213e, goes over the stopper pieces 213d, 213d, and arrives at the pad-engaging portions 213b and 213b on the reaction force side. The assembling of the friction pads 203 on the reaction force side is very easily set to a fixed position.

Figure 15:
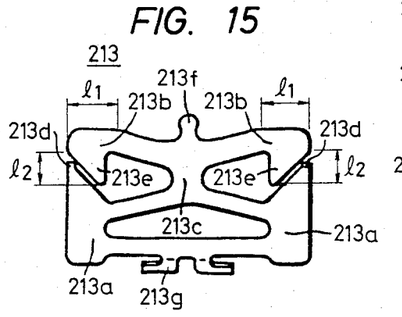
FIG. 15 is a plan view of another embodiment of the pad spring.

FIG. 15 depicts another embodiment of the pad spring 213. This embodiment is similar to the former embodiment except that stopper pieces 213d, 213d are formed outside of the pad-engaging portions 213a, 213a on the operable side, and guide pieces 213e, 213e are formed inside of the pad-engaging portions 213b, 213b with their ends extending on the operable side.

According to this embodiment, it is possible to re-set the friction pad, even when one may accidentally locate both pads at the pad-engaging portions (on the operable side) of the pad spring. This is achieved by positioning a disc between both friction pads and forcing a caliper in the setting direction, whereby the friction pad on the reaction force side is forced up by the disc, and is transferred on the reaction force side. Thus, the friction pad on the reaction force side is guided by the guide pieces into the reaction force side.

Accordingly, the friction pads can easily be assembled to a pad spring of the type in which pad-engaging portions on the operable side are provided apart from those on the reaction force side.

What is claimed is:

1. A disc brake arrangement for vehicles, comprising:
   (A) a disc rotatable with a wheel;
   (B) a pair of friction pads mounted on rear plates and disposed on opposite sides of said disc and movable along the axis of said disc;
   (C) a caliper including:
       (1) a bridge portion having an inner wall extending transversely of said disc,
       (2) an operable portion defining a hydraulic cylinder with a piston therein, said piston being operably connected to one of said pads to move it into contact with said disc, and
       (3) a reaction portion abutting the other said pad, whereby, when said piston is actuated it moves said first pad into contact with said disc, thereby creating a reaction which causes said caliper to move in the opposite direction resulting in said reaction portion pushing said other pad into contact with said disc; and
   (D) a pad spring including two pairs of pad-engaging portions for retaining said friction pads independently of each other in the radial direction of said disc under a given load and comprising:
       (1) a central joining portion extending transversely across said disc, pads, and rear plates, said joining portion engaging a rib portion depending from said inner wall, (2) a first pair of pad-engaging portions formed by arms extending outwardly from one end of said joining portion at a slight angle with respect to said inner wall, said first pair of pad-engaging portions having a width substantially greater than the width of the first of said rear plates, on which said one pad is mounted, and engaging slidably with the upper portion of said first rear plate, (3) a second pair of pad-engaging portions formed by arms extending outwardly from the other end of said joining portion at a slight angle with respect to said inner wall, said second pair of pad-engaging portions having a width substantially equal to the width of the other of said rear plates, on which said other pad is mounted, and engaging with the upper portion of said other rear plate, and (4) a stopper element depending from the end of each pad engaging portion for restraining said pads from free movement along the disc axis.

2. The arrangement as recited in claim 1, in which said friction pads are supported by hanger pins inserted parallel with the axis of said disc, said hanger pins being held in place on a keeping member fixed to said caliper by means of a bolt.

3. The arrangement as recited in claim 1, in which said pad spring is provided at one end extending toward the axis of said disc with a projection which is to be fitted into a through-hole formed in said caliper for receiving a bolt and at the other end with a stopper piece which is to engage with the inner wall of said bridge portion.

4. The arrangement as recited in claim 1, in which said caliper is supported by a bracket in such a manner that it is slidable toward the axis of said disc.

5. The arrangement as recited in claim 4, in which the inside face of said reaction force portion of said caliper is disposed perpendicularly to the axis of said cylinder, and the face of said rib portion formed on the central inner wall of said bridge is disposed parallel with the axis of said cylinder, both said faces being simultaneously flattened by cutting.

6. The arrangement as recited in claim 5, in which the joining portion of said pad spring is engaged with the flat face of said rib portion, and provided with a claw portion which is to engage with both sides of said rib.

7. The arrangement as recited in claim 4, in which said pad spring is provided on the reaction force sides of said pad-engaging portions on the operable side with stopper pieces adapted to restrain the amount of movement of said pad, said pieces being bent in the radial direction of said disc, and on the operable sides of said pad-engaging portions on the reaction force side with guide pieces, said guide pieces extending from said stopper pieces toward the operable side and being bent toward the central inner wall of said bridge portion.

* * * * *